(12) United States Patent
Ackerman et al.

(10) Patent No.: US 9,925,998 B2
(45) Date of Patent: Mar. 27, 2018

(54) CONSOLIDATED PICK AND PACK FOR OUTBOUND FULFILLMENT

(71) Applicant: Amazon Technologies, Inc., Seattle, WA (US)

(72) Inventors: Neil Scott Ackerman, Bellevue, WA (US); Bijal Satish Mehta, Seattle, WA (US); Balaji Nageswaran, Sammamish, WA (US); Rohit Kumar Nathany, Seattle, WA (US); Adrian Dsouza, Seattle, WA (US); Nihar Shashank Nabar, Seattle, WA (US); Mark Wellington Bosley, Seattle, WA (US); Jayson Michael Jochim, Seattle, WA (US); Ingrid Rivera, Seattle, WA (US); Ashwin Philip Ollapally, Seattle, WA (US); Michael Canty, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/573,881

(22) Filed: Dec. 17, 2014

(65) Prior Publication Data
US 2016/0176637 A1    Jun. 23, 2016

(51) Int. Cl.
*B62B 3/00* (2006.01)
*B65G 1/137* (2006.01)
(Continued)

(52) U.S. Cl.
CPC ............ *B62B 3/005* (2013.01); *B65G 1/1373* (2013.01); *B65G 1/1375* (2013.01); *G05B 15/02* (2013.01);
(Continued)

(58) Field of Classification Search
CPC ...... B62B 3/005; B62B 1/202; G06Q 10/0875
See application file for complete search history.

(56) References Cited

U.S. PATENT DOCUMENTS

| 4,496,058 A | * | 1/1985 | Harris | B43L 3/008 |
|---|---|---|---|---|
| | | | | 206/557 |
| 5,127,674 A | * | 7/1992 | Lamphere | B42D 1/001 |
| | | | | 283/36 |

(Continued)

FOREIGN PATENT DOCUMENTS

JP    2002087534    3/2002

OTHER PUBLICATIONS

International Search Report dated Mar. 23, 2016.

*Primary Examiner* — Thomas Randazzo
(74) *Attorney, Agent, or Firm* — Thomas|Horstemeyer, LLP

(57) ABSTRACT

Disclosed are various embodiments for performing a consolidated pick and package process in a materials handling center. A computing environment may be employed to generate a batch of a plurality of items to be picked and packaged in fulfillment of a plurality of orders in the materials handling center. Shipping labels corresponding to items in the orders may be generated, wherein the shipping labels comprise pick information that aids a person in locating a corresponding one of the items in the materials handling center and packaging the corresponding one of the items in suitable packaging. A fulfillment cart may be employed by an operator in performing the consolidated pick and package process.

20 Claims, 8 Drawing Sheets

(51) Int. Cl.
*G05B 15/02* (2006.01)
*G06Q 10/08* (2012.01)
*G06Q 30/06* (2012.01)
*G06Q 50/28* (2012.01)

(52) U.S. Cl.
CPC ........... *G06Q 10/08* (2013.01); *G06Q 10/087* (2013.01); *G06Q 30/0633* (2013.01); *G06Q 30/0639* (2013.01); *G06Q 50/28* (2013.01)

(56) References Cited

U.S. PATENT DOCUMENTS

| | | | | |
|---|---|---|---|---|
| 5,393,965 A * | 2/1995 | Bravman | ............. | G06K 7/1486 235/383 |
| 6,029,380 A * | 2/2000 | Goddard | ............... | B62B 3/1428 224/926 |
| 7,246,706 B1 * | 7/2007 | Shakes | ................... | B07C 7/02 209/614 |
| 7,653,457 B2 * | 1/2010 | Bloom | ..................... | B07C 3/00 209/583 |
| 7,945,455 B2 * | 5/2011 | Zimmermann | ........ | G06Q 10/08 705/2 |
| 8,408,564 B2 * | 4/2013 | Hutchinson | ............... | B62B 3/04 280/47.34 |
| 8,489,471 B2 * | 7/2013 | Kurashima | .......... | G06Q 10/087 705/22 |
| 8,739,986 B2 * | 6/2014 | Preidt | ..................... | A47F 5/00 108/187 |
| 9,189,769 B2 * | 11/2015 | Caputo | ................. | G06Q 10/087 |
| 9,216,751 B2 * | 12/2015 | Adams | .................... | A47L 13/51 |
| 9,440,759 B2 * | 9/2016 | Reed | ....................... | B65C 1/028 |
| 2002/0059121 A1 * | 5/2002 | Schneider | ............. | G06Q 10/08 705/28 |
| 2003/0155731 A1 * | 8/2003 | Ditges | .................... | B62B 3/006 280/47.35 |
| 2005/0057011 A1 * | 3/2005 | Chang | .................. | B62B 5/0003 280/47.35 |
| 2006/0006621 A1 * | 1/2006 | Santa Cruz | .............. | B25H 3/00 280/79.3 |
| 2006/0145436 A1 * | 7/2006 | Varricchio | ................ | B62B 3/14 280/33.992 |
| 2006/0289637 A1 * | 12/2006 | Brice | ................... | G06Q 10/087 235/385 |
| 2013/0211977 A1 * | 8/2013 | Lyon | ................... | G06Q 10/0875 705/29 |
| 2013/0332322 A1 * | 12/2013 | Perkins | ................... | B62B 3/148 705/28 |
| 2014/0265440 A1 * | 9/2014 | Chen | .................... | B62B 5/0006 296/186.1 |
| 2015/0371318 A1 * | 12/2015 | Hen | ................... | G06Q 10/083 705/26.81 |
| 2016/0052535 A1 * | 2/2016 | Groat | .................... | B62B 5/0026 280/47.34 |

* cited by examiner

CONSOLIDATED PICK AND PACK FOR OUTBOUND FULFILLMENT

BACKGROUND

Fulfillment centers are employed to fulfill orders made by consumers over an electronic commerce system or another order generation system. Personnel in fulfillment centers are often required to fulfill thousands to millions of orders within a short period of time by employing a combination of manual and automated processes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
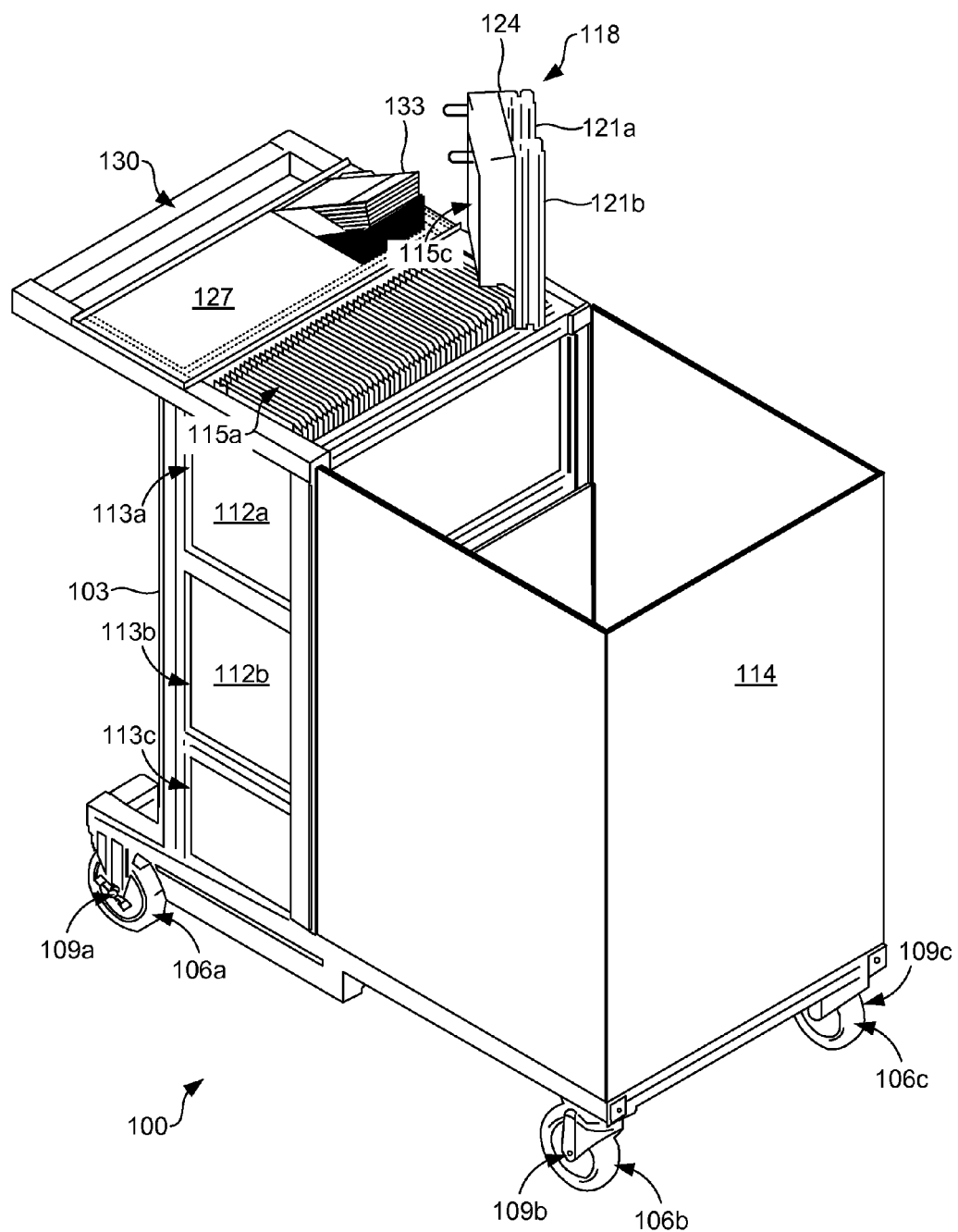
FIGS. 1A-1D are drawings of a fulfillment cart according to various embodiments of the present disclosure.

The present disclosure relates to a consolidated pick and package process for outbound fulfillment. In a materials handling center, orders for goods may be fulfilled by pulling items off of shelves, out of bins, etc.; moving the items to a sorting station; packaging the items at a packaging station; and shipping the items to a destination location. For example, as orders are placed for goods over an electronic commerce system, personnel in a materials handling center are assigned to pick items purchased, rented, leased or otherwise requested or consumed from an inventory location, sort the items according to their order or shipment, package the items in shipping mailers, and ship the items to a destination location.

Each of the steps performed in the fulfillment of an order requires personnel trained to perform those steps. Infrastructure, such as network-enabled computer devices, printers, and barcode scanners, may be required by personnel to pick items, sort items, pack items, or perform other operations in the materials handling center. Further, each of the steps performed in the fulfillment of an order may take up a considerable amount of time and may require a significant amount of space. For example, an area for a sorting station must be allocated to be used by personnel for sorting items picked from the inventory locations. Similarly, space for a packaging station must be allocated to be used by personnel for packaging items that have been picked and sorted.

According to various embodiments as described herein, a picking operation and a packaging operation are consolidated by packaging the items as they are picked from their inventory locations. In various embodiments, a computing environment may be employed to generate a batch of items to be picked and packaged in fulfillment of one or more orders to minimize a distance traveled by personnel fulfilling the one or more of the orders. For example, the batch of items may be generated based at least in part on a pick zone, where the items to be picked are in an inventory location within the pick zone. The computing environment may generate shipping labels for each of the items. In various embodiments, the shipping labels may comprise pick information that aids personnel in locating a corresponding one of the items in a materials handling center. For example, the pick information on a shipping label may include an identifiable inventory location such as an aisle number, a bin number, a shelf number, a serial identification number, a quantity, an item name, an item description, and/or other information that may be useful in locating an item in the materials handling center. Similarly, the pick information may aid personnel in packaging the corresponding one of the items in a suitable packaging or mailer (e.g., envelope, padded envelope, box, or other suitable packaging).

The computing environment may cause a printing of the shipping labels in an order of picking. For example, a first one of the shipping labels may direct fulfillment center personnel to an inventory location of a first item to be picked and packaged in a mailer with the first one of the shipping labels. Personnel in the materials handling center may progress through the shipping labels in the order of picking and packing until the last one of the shipping labels is affixed to a package or mailer with a corresponding item.

In various embodiments, the computing environment may generate a pick manifest (also referred to as a summary pick sheet) that directs personnel in fulfillment of a batch of orders while minimizing a distance required to be traveling by the personnel. To this end, the personnel in the materials handling center assigned to pick and package items (hereinafter an "operator") may use the pick manifest and/or the shipping labels to proceed to a first inventory location. Utilizing the pick manifest and/or the shipping labels, the operator may take a top-most shipping label, attach the shipping label to a mailer, place one or more of the items inside the mailer, and seal the mailer for shipment. The sealed mailer may be placed in a bin for packaged items. The operator may proceed to a next inventory location identified in the pick manifest or on the next shipping label and proceed accordingly until all items in the batch are picked and packaged. When all items in the batch are picked and packaged, the operator may move the bin of packaged items to a suitable location for scanning a tracking identifier on the shipping labels of the packaged items. In response to a scan of a tracking identifier for a corresponding one of the packaged items, an order of the item may be updated to a "packaged" or a "shipped" state by the computing environment.

Further, in various embodiments, a fulfillment cart may be utilized in a consolidated pick and package operation. The fulfillment cart may comprise, for example, a mobile cart having a frame with a plurality of containers for storing mailers and a bin for storing packaged items. The computing environment may generate instructions that direct personnel in the materials handling center to properly configure and/or equip the fulfillment cart in order to perform a complete pick and package operation for a batch.

With reference to FIG. 1A, shown is a non-limiting example of a fulfillment cart 100 according to various embodiments. As shown in FIG. 1A, a fulfillment cart 100 may comprise a frame 103 constructed out of aluminum, steel, plastic, any other suitable material, or any combination thereof. The frame 103 may be mounted upon a plurality of wheels 106a . . . 106d (collectively wheels 106, not all shown) that facilitate a movement of the fulfillment cart 100 throughout a materials handling center or other similar environment. In some embodiments, the wheels 106 located in a back of the fulfillment cart 100 may comprise swivel wheels capable of rotating 360 degrees, or some other fixed amount, while the wheels 106 located at the front of the fulfillment cart 100 may be fixed in orientation, or vice versa. In some embodiments, all wheels 106 mounted to the frame 103 of the fulfillment cart 100 may comprise swivel wheels. In various embodiments, all or a portion of the wheels 106 may be configured with a brake 109 that prevents a rotation of the wheels 106 when desired. For example, the brake 109 may comprise a swivel lock, a pneumatic brake, an electric brake, or other suitable brake.

To facilitate a pick and package process where items are packaged in packages or mailers as they are picked from inventory locations, the fulfillment cart 100 may comprise a plurality of containers 112a . . . 112b inserted into a plurality of compartments 113a . . . 113c (collectively compartments 113) of the frame 103. Consequently, the compartments 113 of the fulfillment cart 100 may be configured to accommodate containers 112 or other inserts that hold materials for use in the pick and package process. Although the non-limiting example of FIG. 1A shows two containers 112a . . . 112b (collectively containers 112), the fulfillment cart 100 may be configured to include one or more containers 112, as can be appreciated.

Further, a bin 114 may be detachably attached to the frame 103 of the fulfillment cart 100 at a suitable location. With respect to the pick and package process, a first container 112a may comprise a removed top portion such that, when attached to the frame 103, the contents of the first container 112a are exposed to a top of the fulfillment cart 100. According to various embodiments, the first container 112a may comprise a first type of mailer 115a (e.g., envelopes, padded envelopes or mailers, boxes) such that an operator performing a pick and package operation can quickly access the first type of mailer 115a. In various embodiments, the first container 112a may be a primary location for retrieving mailers 115a.

In some embodiments, the second container 112b may be detachably attached to a compartment 113 in the frame 103 of the fulfillment cart 100 in a location beneath the first container 112a. The second container 112b may comprise a different type of mailer 115b (e.g., envelopes, padded envelopes or mailers, boxes) from those set forth in the first container 112a such that an operator performing a pick and package operation can access different types of mailers 115a, 115b from either the first container 112a or the second container 112b. Alternatively, the second container 112b may be employed to store a reserve supply of the same type of mailer 115a stored in the first container 112a.

As the items are packaged and/or sealed in a mailer 115, the packaged items may be placed in the bin 114. In various embodiments, the bin 114 is larger than the first container 112a and/or the second container 112b, as the dimensions of the mailers 115 may expand or increase when items are placed inside the mailers 115. Further, in some embodiments, the bin 114 may be detachably attached to the frame 103 of the fulfillment cart 100. Thus, as the bin 114 is filled with packaged items, it may be periodically replaced with empty bins 114 without substantially interrupting the pick and package process. In various embodiments, one or more wheels 106 of the fulfillment cart 100, or one or more additional wheels, may be fixed to the bin 114 such that, when removed from the fulfillment cart 100, the bin 114 is capable of being pushed throughout the materials handling center independent from the fulfillment cart 100.

In various embodiments, the fulfillment cart 100 comprises a hanging arrangement 118 configured to hold a third type of mailer 115c, such as polyethylene mailers 115c. The hanging arrangement 118 may comprise, for example, one or more legs 121a . . . 121b (collectively legs 121) vertically protruding from the frame 103 of the fulfillment cart 100 and configured to support a base 124 from which a third type of mailer 115c may detachably attach or otherwise hang.

Moving on, the fulfillment cart 100 may comprise a processing tray 127 located at a front of the fulfillment cart 100 and/or adjacent to a push handle 130 of the fulfillment cart 100. Thus, as an operator or another operator of the fulfillment cart 100 makes frequent stops while navigating a materials handling center, the operator can quickly use the processing tray 127 as a platform to, for example, affix a shipping label to a mailer 115, place an item picked from an inventory location in the mailer 115, or any other suitable operation. To store shipping labels, the fulfillment cart 100 may comprise a shipping label holder 133. As discussed herein, a shipping label may comprise pick information that directs personnel in the materials handling center to locate an item corresponding to the shipping label. Further, the pick information may include a type of mailer 115 for packaging the item corresponding to the shipping label. As the shipping labels instruct personnel where to navigate the fulfillment cart 100, the shipping label holder 133 may be positioned at the front of the fulfillment cart 100 to expose the shipping labels to the operator while the fulfillment cart 100 is in use.

In various embodiments, the shipping label holder 133 may be positioned at an end of the processing tray 127. The shipping label holder 133 may be configured to retain printed shipping labels in a secure or fixed position as the fulfillment cart 100 is moved throughout a facility. Further, the shipping label holder 133 may be configured such that a top-most one of the shipping labels stored within the shipping label holder 133 is viewable by the operator at an angled position. In various embodiments, a front portion of the shipping label holder 133 may be recessed or otherwise positioned below a rear portion of the shipping label holder 133, thereby creating a trapezoidal stack of shipping labels, as shown in FIG. 1A. As a result, the operator can view pick information on a top-most one of the shipping labels during movement of the fulfillment cart 100. In various embodiments, the shipping label holder 133 may be in an angled position that causes one corner of the shipping labels to be higher than all other corners of the shipping labels.

In some embodiments, the fulfillment cart 100 may comprise, for example, a barcode scanner, an imaging device (e.g., a digital camera), a printer, or other peripheral computing devices. Alternatively, in various embodiments, the fulfillment cart 100 does not include any computing devices, scanners, imaging devices, printers, or other peripheral computing devices.

Figure 1B:
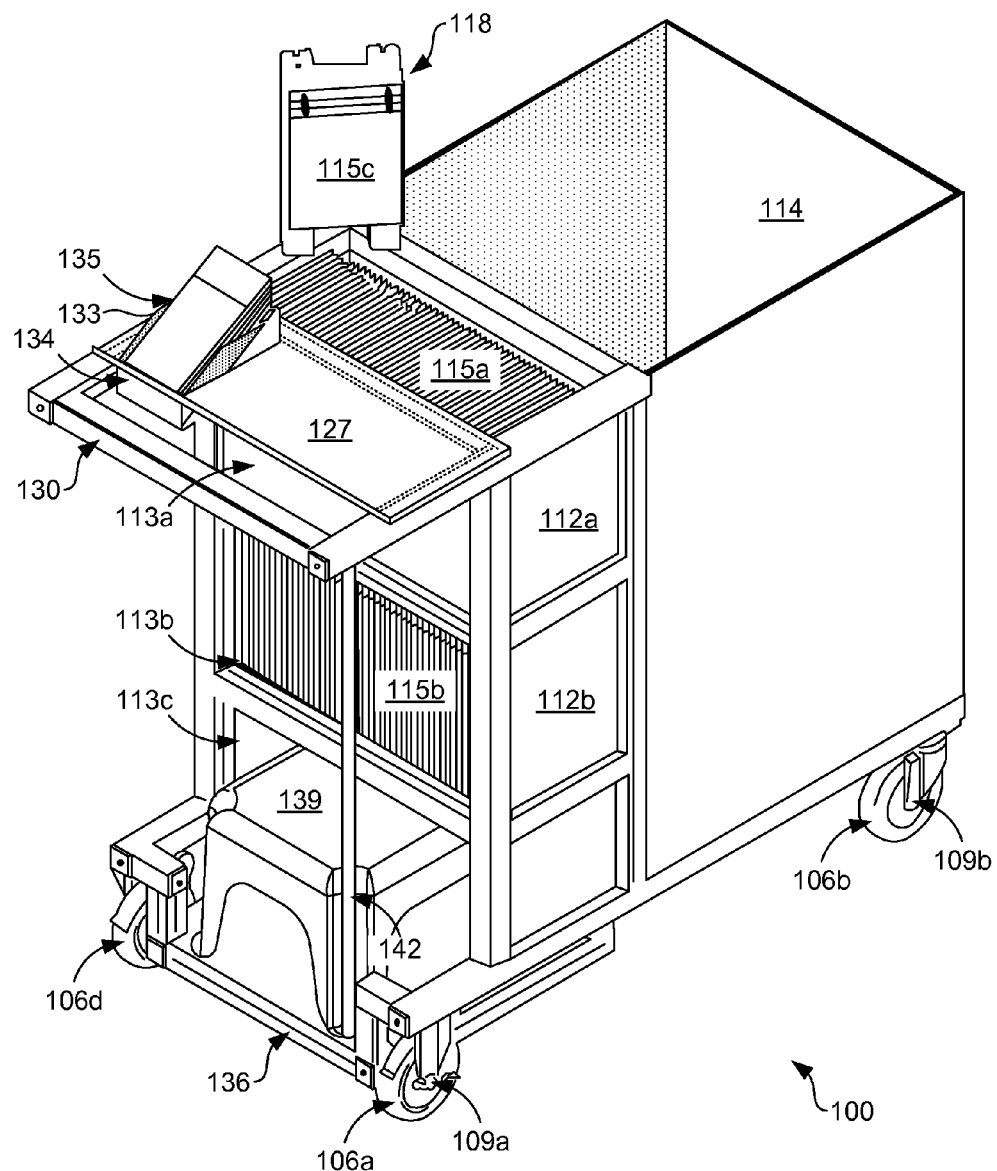

Moving on to FIG. 1B, shown is another view of the fulfillment cart 100 of FIG. 1A according to various embodiments. Similar to the drawing of FIG. 1A, the fulfillment cart 100 comprises the frame 103 mounted upon a plurality of wheels 106a . . . 106d (not all shown) that facilitate a movement of the fulfillment cart 100 when handled by an operator. In some embodiments, all or a portion of the wheels 106 may be configured with a brake 109 that prevents a rotation of a corresponding one of the wheels 106 if desired. In various embodiments, the brake 109 may comprise a swivel lock, a pneumatic brake, an electric brake, or other suitable brake.

The fulfillment cart 100 of FIG. 1B comprises a plurality of containers 112a . . . 112b in one or more of the compartments 113a . . . 113c. In the non-limiting example of FIG. 1B, the second container 112b of the fulfillment cart 100 may comprise an exposed portion that faces the push handle 130 of the fulfillment cart 100 such that, when attached to the frame 103, the contents of the second container 112b are exposed to a front of the fulfillment cart 100. As a result, the operator may access contents of the second container 112b without having to remove the second container 112b from the frame 103 and without having to leave a front of the fulfillment cart 100. For example, as the operator performs a pick and package operation, the operator can quickly access the mailers 115b stored in the second container 112b as well as the mailers 115a stored in the first container 112a.

In various embodiments, each of the containers 112 may store a different type of mailer 115. For example, the first container 112a of the fulfillment cart 100 may comprise a first type of mailer 115a (e.g., envelopes), the second container 112b may comprise a second type of mailer 115b (e.g., padded envelopes or mailers), and the hanging arrangement 118 may comprise a third type of mailer 115c (e.g., polyethylene mailers). In other embodiments, the same type of mailer 115 may be stored in the first container 112a, the second container 112b, and/or on the hanging arrangement 118. In various embodiments, the first container 112a may be a primary location for retrieving mailers 115. In other embodiments, the second container 112b or the hanging arrangement 118 may be a primary location for retrieving mailers 115.

As an operator packages items retrieved from inventory locations into the mailers 115, the packaged items may be placed in the bin 114. In the non-limiting example of FIG. 1B, the bin 114 is larger than the first container 112a and/or the second container 112b, as the dimensions of the mailers 115 may increase when items are placed inside the mailers 115. Further, in some embodiments, bin 114 may be detachably attached to the frame 103 of the fulfillment cart 100. Thus, as the bin 114 is filled with packaged items, it may be periodically replaced with empty bins 114 without substantially interrupting the pick and package process.

The processing tray 127 may be located at a front of the fulfillment cart 100 adjacent to the push handle 130, or at any other suitable location. As the operator pushes the fulfillment cart 100 using the push handle 130, the operator can quickly employ the processing tray 127 as a platform to affix a shipping label to a mailer 115, place an item within the mailer 115, or any other suitable operation. In some embodiments, the shipping label holder 133 may be positioned at the front of the fulfillment cart 100 and at an end of the processing tray 127. The shipping label holder 133 may be configured to secure printed shipping labels in a fixed position as the fulfillment cart 100 is moved throughout a facility. In various embodiments, a front portion 134 of the shipping label holder 133 may be recessed or otherwise positioned below a rear portion 135 of the shipping label holder 133, thereby creating a trapezoidal stack of shipping labels, as shown in FIG. 1A. Similarly, in some embodiments, the front portion 134 of the shipping label holder 133 may be recessed below the processing tray 127 and/or the push handle 130.

In various embodiments, the frame 103 of the fulfillment cart 100 may comprise a lower platform 136 configured to support the one or more containers 112 and/or a stool 139 that may be employed by the operator to access items stored at various inventory locations, e.g., at high locations, upper shelves, etc. Thus, the operator may remove the stool 139 from a compartment 113 of the fulfillment cart 100, place the stool 139 in an appropriate location in a facility, and use the stool 139 to retrieve an item from its inventory location. In various embodiments, the stool 139 may be replaced with a step ladder or another container 112 for storing mailers 115 or packaged items.

A vertically protruding bar 142 may be configured to secure and retain the stool 139 in a fixed position as the fulfillment cart 100 is moved throughout a materials handling center. The vertically protruding bar 142 may be detachably attached to the frame 103 and/or the lower platform 136 of the fulfillment cart 100. In some embodiments, the vertically protruding bar 142 may not be required to be detached to remove or otherwise access the stool 139 positioned on the lower platform 136. In various embodiments, the vertically protruding bar 142 may comprise a handle (not shown) that may be used to remove the vertically protruding bar 142 from the frame 103. In some embodiments, the vertically protruding bar 142 may be attached to the stool 139 and comprise a handle (not shown), to remove the stool 139 from the frame 103 without bending down or to obtain balance when stepping on/off or standing on the stool 139, move the fulfillment cart 100, etc.

In various embodiments, the lower platform 136 of the fulfillment cart 100 may be located at a plane level with a center of the front wheels 106a . . . 106b of the fulfillment cart 100. In other embodiments, the lower platform 136 may be positioned above a plane of the center of the front wheels 106a . . . 106b to provide additional clearance for potential obstacles that may be in a path of the fulfillment cart 100 during its movement. Alternatively, the lower platform 136 may be recessed and positioned below a plane of the center of the front wheels 106a . . . 106b, for example, to provide a low center of mass for the fulfillment cart 100.

Figure 1C:
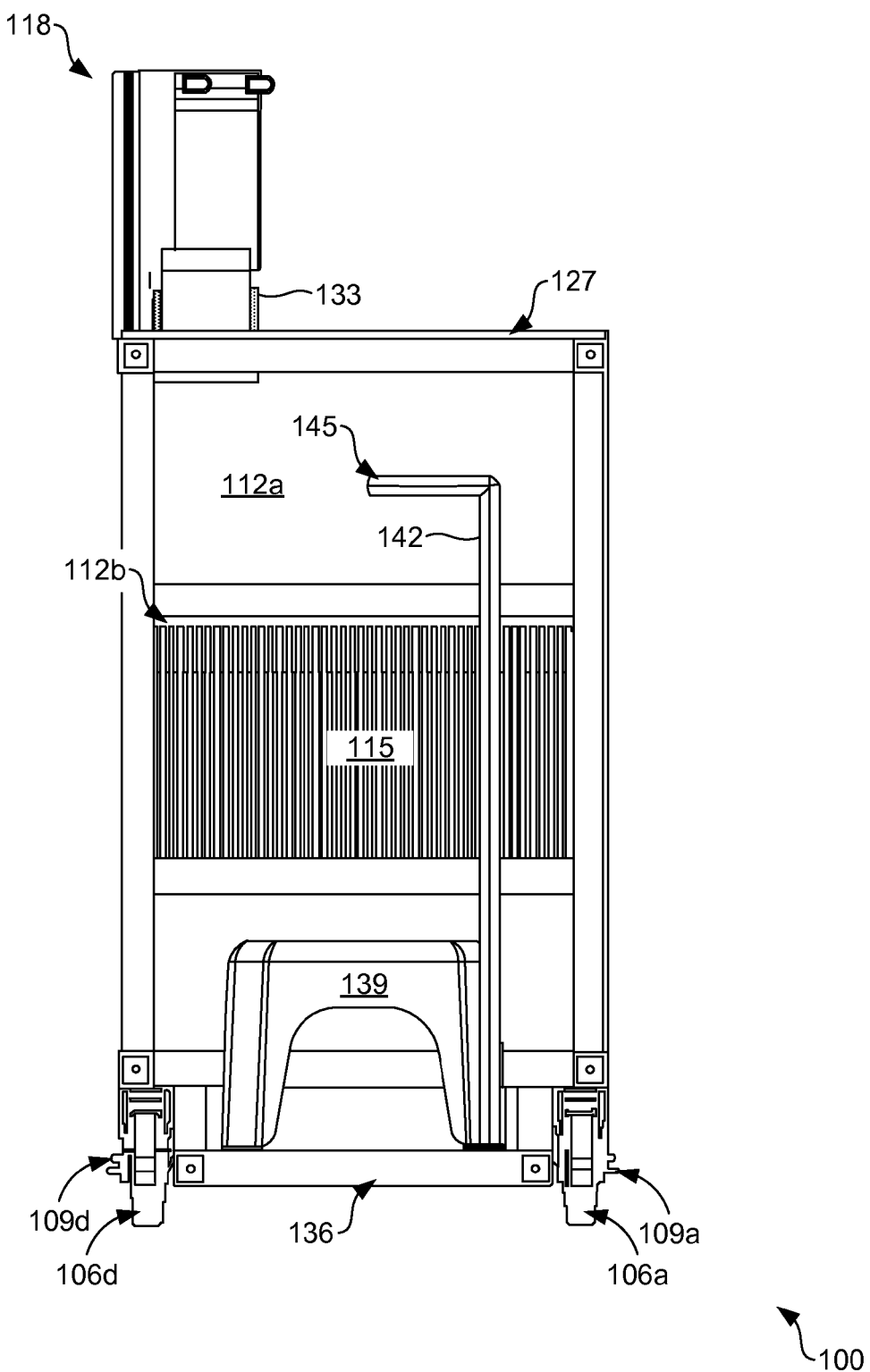

Referring next to FIG. 1C, shown is a front view of the fulfillment cart 100 as described herein. In various embodiments, the fulfillment cart 100 comprises the frame 103 mounted upon a plurality of wheels 106a . . . 106d (not all shown) that facilitate a movement of the fulfillment cart 100 through a facility. In some embodiments, all or a portion of the wheels 106 may be configured with brakes 109a . . . 109d (collectively brakes 109) that prevent a rotation of the wheels 106 if desired. In various embodiments, the brakes 109 may comprise a swivel lock, a pneumatic brake, an electric brake, or other suitable brake.

The front view of the fulfillment cart 100 of FIG. 1C shows a first container 112a and a second container 112b, although other containers 112 may be employed. As shown in FIG. 1C, the second container 112b comprises an exposed portion that faces a front of the fulfillment cart 100 such that, when attached to the frame 103, the contents of the second container 112b are exposed to a front of the fulfillment cart 100. As a result, the operator performing a pick and package operation can quickly access the mailers 115 stored in the second container 112b as well as the mailers 115 stored in the first container 112a or on the hanging arrangement 118 during periodic stops.

The lower platform 136 is configured to support the one or more containers 112 and/or the stool 139 that may be employed by the operator to access items stored at various inventory locations. Thus, the operator may remove the stool 139 from the fulfillment cart 100, place the stool 139 in an appropriate location, and use the stool 139 to retrieve an item from its inventory location. The vertically protruding bar 142 may be positioned on the lower platform 136 to secure and retain the stool 139 in a fixed position as the fulfillment cart 100 is moved throughout a materials handling center. In various embodiments, the vertically protruding bar 142 may comprise a handle 145 to facilitate a movement of the fulfillment cart 100 by the operator. In various embodiments, the vertically protruding bar 142 may be detachably attached to the frame 103 and/or the lower platform 136 of the fulfillment cart 100. In some embodiments, the vertically protruding bar 142 may not be required to be detached to remove or otherwise access the stool 139 positioned on the lower platform 136. In various embodiments, the vertically protruding bar 142 may comprise a handle 145 that may be used to remove the vertically protruding bar 142 from the frame 103. In some embodiments, the vertically protruding bar 142 may be attached to the stool 139 and comprise a handle 145 to remove the stool 139 from the frame 103 without bending down, to obtain balance when stepping on/off the stool, to obtain balance when standing on the stool 139, to move the fulfillment cart 100, etc.

The shipping label holder 133 may be positioned at the front of the fulfillment cart 100, for example, at an end of the processing tray 127. The shipping label holder 133 may be configured to retain printed shipping labels in a secure or fixed position as the fulfillment cart 100 is moved throughout a facility. As an operator pushes the fulfillment cart 100 around a materials handling center, the operator can use the processing tray 127 to affix a shipping label to a mailer 115, place an item within the mailer 115, and place the packaged item in a proper container.

Next, with respect to FIG. 1 D, shown is a side view of the fulfillment cart 100 comprising the frame 103 mounted upon a plurality of wheels 106a . . . 106d (not all shown) that facilitate a movement of the fulfillment cart 100 around a facility. In some embodiments, all or a portion of the wheels 106 may be configured with brakes 109 that prevents a rotation of the wheels 106 if desired. In various embodiments, the brakes 109 may comprise a swivel lock, a pneumatic brake, an electric brake, or other suitable brake.

Figure 1D:
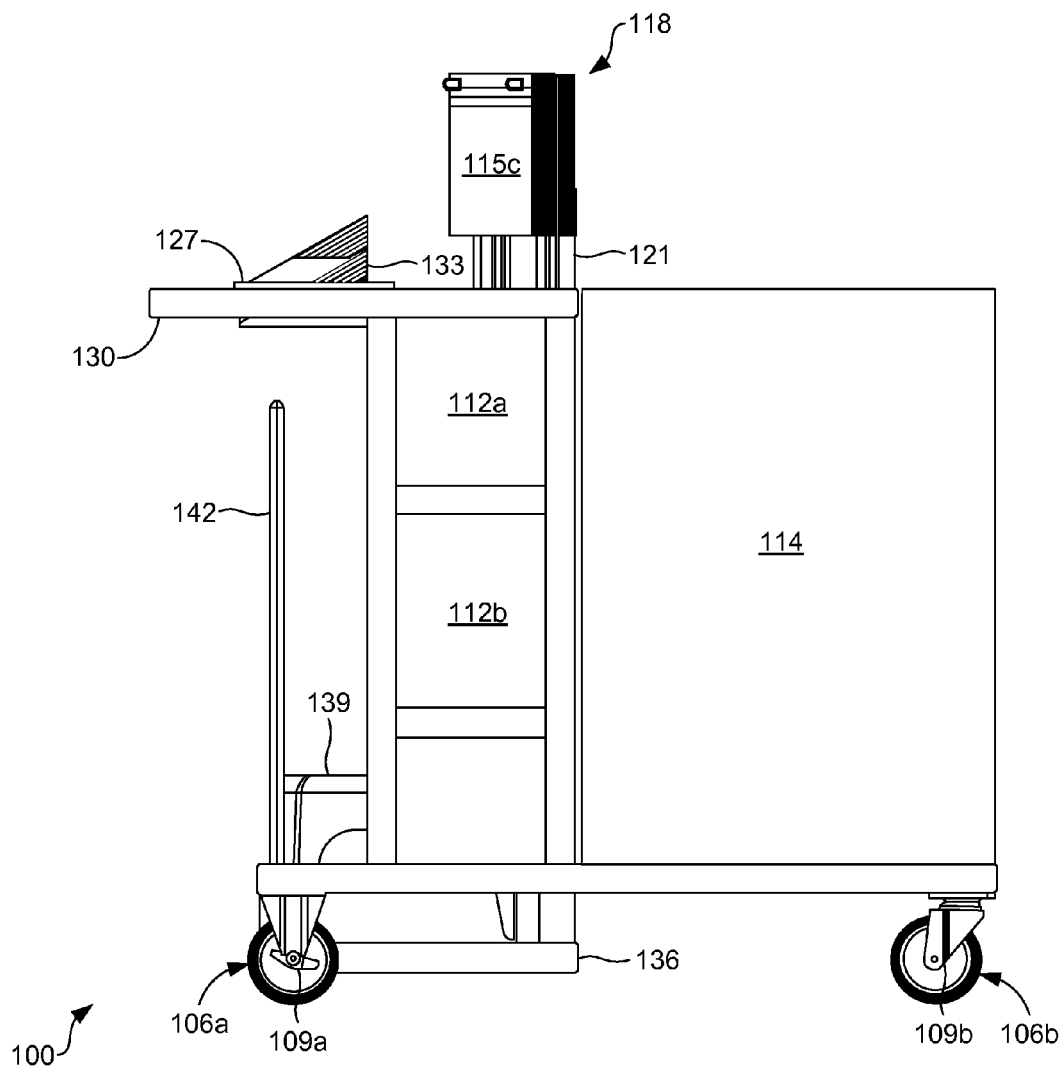

The side view of the fulfillment cart 100 of FIG. 1D shows a first container 112a, a second container 112b, and a bin 114, although other containers 112 or bins 114 may be employed. In various embodiments, the first container 112a and the second container 112b may be used for storing mailers 115 while the bin 114 is used for storing packaged items. Further, the hanging arrangement 118 may further store mailers 115 for access by the operator. For example, as the operator performs a pick and package operation, the operator can access the mailers 115 located in the first container 112a, the second container 112b, or on the hanging arrangement 118. According to various embodiments, the hanging arrangement 118 may comprise, for example, one or more legs 121 (collectively legs 121) vertically protruding from the frame 103 of the fulfillment cart 100 configured to hold a base 124 from which the mailers 115 may hang.

The shipping label holder 133 may be positioned at the front of the fulfillment cart 100 and/or at an end of the processing tray 127. The shipping label holder 133 may be configured to retain printed shipping labels in a fixed position as the fulfillment cart 100 is moved throughout a facility. Further, the shipping label holder 133 may be configured such that shipping labels stored within the shipping label holder 133 are at an angled position. As a result, an operator can view a top-most one of the shipping labels during movement of the fulfillment cart 100. As will be described, the shipping labels may direct an operator or another operator of the fulfillment cart 100 to an inventory location of an item to be packaged in a mailer. For example, the top-most of the shipping labels in the shipping label holder 133 may direct the operator to the next inventory location in a pick route.

The lower platform 136 of the fulfillment cart 100 is configured to support the one or more containers 112 and/or a stool 139 that may be employed by the operator to access items stored at various inventory locations. Thus, the operator may remove the stool 139 from the fulfillment cart 100, place the stool 139 in an appropriate location, and use the stool 139 to retrieve an item from its inventory location. The vertically protruding bar 142 may be positioned on the lower platform 136 to secure and retain the stool 139 in a fixed position as the fulfillment cart 100 is moved throughout a materials handling center. In various embodiments, the vertically protruding bar 142 may be detachably attached to the frame 103 and/or the lower platform 136 of the fulfillment cart 100. In some embodiments, the vertically protruding bar 142 may not be required to be detached to remove or otherwise access the stool 139 positioned on the lower platform 136. In various embodiments, the vertically protruding bar 142 may comprise a handle 145 that may be used to remove the vertically protruding bar 142 from the frame 103, or the vertically protruding bar 142 may be attached to the stool 139 and comprise a handle 145 to remove the stool 139 from the frame 103 without bending down, obtain balance when stepping on/off or standing on the stool 139, move the fulfillment cart 100, etc.

Figure 2:
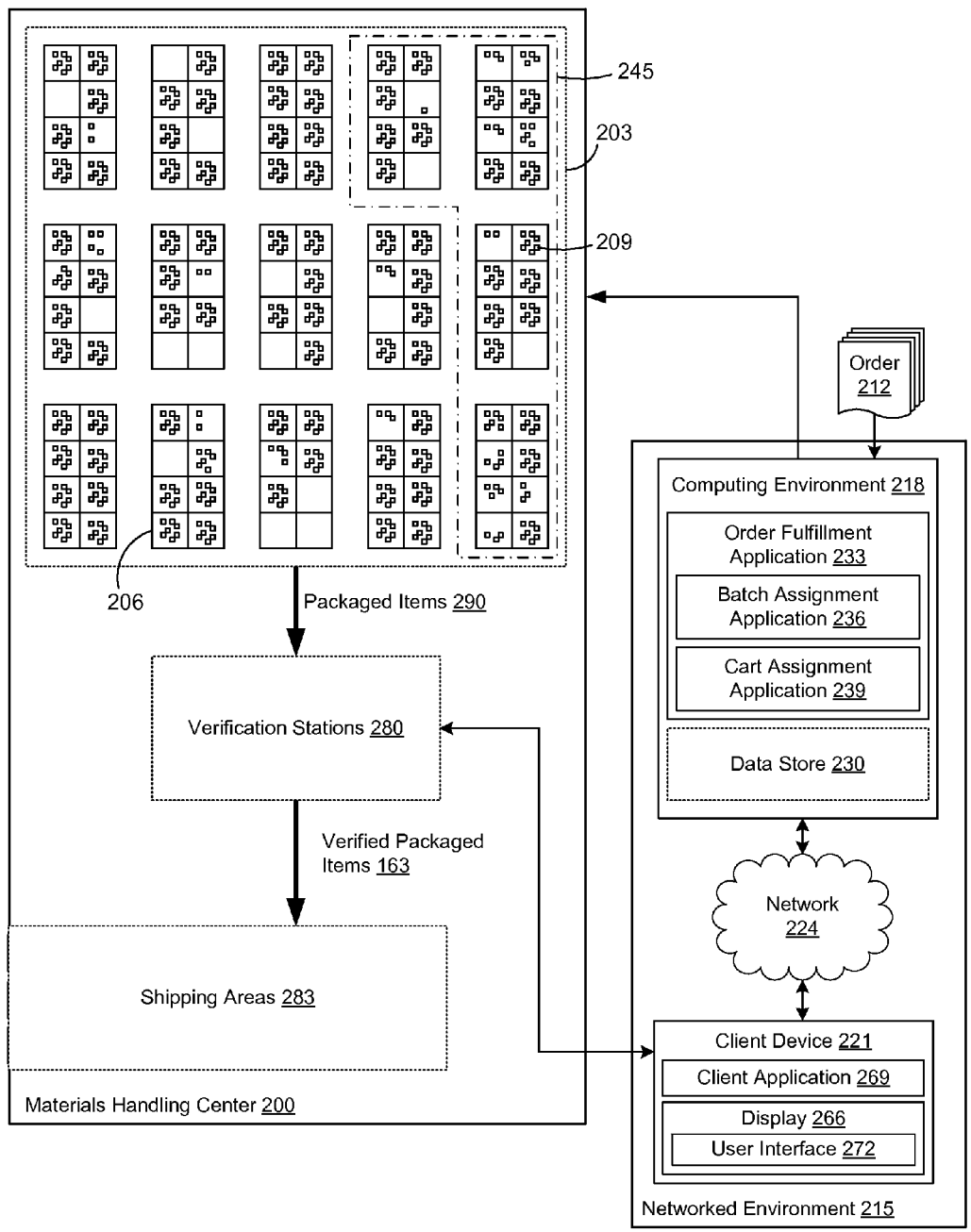
FIG. 2 is a drawing of a materials handling center that is associated with a networked environment according to various embodiments of the present disclosure.

With reference to FIG. 2, shown is a drawing that depicts one example of a materials handling center 200 according to an embodiment of the present disclosure. A materials handling center 200 may include, but is not limited to, a warehouse, distribution center, cross-docking facility, order fulfillment center (also referred to as a fulfillment facility), packaging facility, shipping facility, or other facility or combination of facilities for performing one or more functions of material or inventory handling. Although the materials handling center 200 is described herein with specific reference to a fulfillment center, it is understood that a materials handling center 200 provides one example of many other types of environments to which the principles described herein apply.

According to the illustration provided herein, the materials handling center 200 may comprise, for example, a large warehouse or other structure that includes an inventory storage area 203 having a plurality of inventory locations 206. The inventory locations 206 are generally locations configured for the storage of an inventory of items 209. To this end, the inventory locations 206 may comprise, for example, bins, slots, shelves, containers, receptacles, crates, stalls, cribs, cordoned areas, hooks, racks, or other locations, etc. The items 209 are stored in the inventory locations 206 as can be appreciated. The materials handling center 200 may be configured to provide fulfillment of orders 212 received for the items 209 that are purchased, rented, leased or otherwise consumed or requested, as will be described.

The items 209 may comprise, for example, products that are purchased or requested by consumers through various channels. Such products may be any type of product that can be purchased and delivered to customers such as, for example, clothing items, retail goods, hardware, electronics, toys, media items, edible items, or any other product. In various embodiments, the items 209 fulfilled in the materials handling center 200 may be purchased over an electronic commerce system.

Associated with the materials handling center facility is a networked environment 215 that orchestrates the operation of the materials handling center 200 in fulfilling orders 212 for the purchase of items 209 or orders 212 for the movement of items 209 to other materials handling center 200. The networked environment 215 includes a computing environment 218 and a client device 221, which are in data communication with each other via a network 224. The network 224 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 218 may comprise, for example, a server computer or any other system providing computing capability. Alternatively, the computing environment 218 may employ a plurality of computing devices that may be arranged, for example, in one or more server banks or computer banks or other arrangements. Such computing devices may be located in a single installation or may be distributed among many different geographical locations. For example, the computing environment 218 may include a plurality of computing devices that together may comprise a hosted computing resource, a grid computing resource and/or any other distributed computing arrangement. In some cases, the computing environment 218 may correspond to an elastic computing resource where the allotted capacity of processing, network, storage, or other computing-related resources may vary over time.

Various applications and/or other functionality may be executed in the computing environment 218 according to various embodiments. Also, various data is stored in a data store 230 that is accessible to the computing environment 218. The data store 230 may be representative of a plurality of data stores 230 as can be appreciated. The data stored in the data store 230, for example, is associated with the operation of the various applications and/or functional entities described below.

The components executed on the computing environment 218, for example, include an order fulfillment application 233, and other applications, services, processes, systems, engines, or functionality not discussed in detail herein. The order fulfillment application 233 is executed to orchestrate a picking and a packaging of items 209 from inventory locations 206 in the materials handling center 200 for shipment to customers. Accordingly, in various embodiments, the order fulfillment application 233 comprises a batch assignment application 236, a cart configuration application 239, or similar applications or services.

The batch assignment application 236 is executed to generate one or more batches of items 209 to be picked and packaged in fulfillment of orders 212 received by the computing environment 218. For example, a batch may comprise items 209 identified from the orders 212 that are to be mailed to consumers. Batches may be generated based at least in part on personnel performing a picking and packaging, picking zones 245 in the materials handling center 200, inventory locations 206 of the items 209, and/or other information. As a result, a batch may be generated to direct an operator or another operator of the fulfillment cart 100 to various inventory locations 206 in the materials handling center 200 in an efficient manner. For example, a batch may be generated for items 209 that are in the same picking zone 245 to prevent personnel from having to travel great distances in the materials handling center 200 to access items 209 in inventory locations 206.

The cart configuration application 239 is executed to generate a cart configuration manifest having instructions to direct personnel to properly configure and/or equip the fulfillment cart 100 such that a picking and packaging of items 209 may be performed without performing tasks beyond an initial configuration of the fulfillment cart 100. For example, the cart configuration application 239 may direct personnel to load a predefined number of a first type of mailer 115 (FIG. 1A) in a first container 112 (FIG. 1A), a predefined number of a second type of mailer 115 in a second container 112, and so forth, in order to perform fulfillment of a batch generated by the batch assignment application 236. Further, a plurality of containers 112 may be preloaded with a type of mailer 115 and may be stored in certain areas of the materials handling center 200. The cart configuration manifest may direct an operator to detachably attach a preloaded container 112 to the frame 103 of the fulfillment cart 100. To this end, time used by personnel in retrieving additional mailers 115, stools 139, shipping labels, or other tasks may be reduced or avoided.

The data stored in the data store 230 includes, for example, generated shipping labels, pick manifests, cart configuration manifests, as well as data associated with fulfillment carts 100, orders 212, inventory locations 206, inventory items 209, picking zones 245, and potentially other data.

The client device 221 is representative of a plurality of client devices 221 that may be coupled to the network 224. The client device 221 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. In various embodiments, the client device 221 may be at a location in the materials handling center 200. The client device 221 may include a display 266. The display 266 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 221 may be configured to execute various applications such as a client application 269 and/or other applications. The client application 269 may be executed in a client device 221, for example, to access network content served up by the computing environment 218 and/or other servers, thereby rendering a user interface 272 on the display 266. To this end, the client application 269 may comprise, for example, a browser, a dedicated application, etc., and the user interface 272 may comprise a network page, an application screen, etc. The client device 221 may be configured to execute applications beyond the client application 269 such as, for example, email applications, social networking applications, word processors, spreadsheets, and/or other applications.

The materials handling center 200 may include various verification stations 280, shipping areas 283, and sorting stations. In some situations, the items 209 from many different orders 212 are picked and packaged from the inventory locations 206 and flow as packaged items 290 to one or more verification stations 280. To this end, various batches of orders 212 may be picked at the same time and flow together to a given verification station 280, where the packaged items 290 are inspected to confirm whether an order 212 associated with a shipment has been correctly fulfilled. In various embodiments, a weight of a packaged item 290 may be compared against a weight of the items 209 associated with a corresponding order 212. If the weights are equal, or if they are within a predefined threshold, the packaged item 290 may be confirmed as having the proper items 209 within the mailer 115. Once packaged items 290 are verified, then the packaged items 290 may be sorted according to their destinations and forwarded to the shipping areas 283 for placement on transport vehicles, such as delivery trucks, for shipment to destination addresses.

Next, a description of the general operation of a materials handling center 200 is provided in association with the networked environment 215 according to various embodiments. To begin, the order fulfillment application 233 receives orders 212 for the purchase of items 209 from an order generation system. Such an order generation system may comprise, for example, an electronic commerce system that facilitates the ordering and purchasing of goods over the internet or other networks as can be appreciated. Such systems are employed, for example, by on-line merchants that sell their products via an Internet presence. Alternatively, the orders 212 may be generated by telephone through telephone operators. Orders 212 for items 209 may also be generated using kiosks or other order generation systems located in stores or other locations as can be appreciated.

The order fulfillment application 233 is configured to execute the batch assignment application 236 and the cart configuration application 239, as described above. For example, assuming that several orders 212 for items 209 have been received by the order fulfillment application 233, then the batch assignment application 236 generates a pick manifest and/or one or more shipping labels that direct the picking of items 209 from various inventory locations 206 in the materials handling center 200 in fulfillment of orders 212. In various embodiments, the pick manifest dictates routes that operators may follow through the inventory storage area 203 of the materials handling center 200 in order to pick and package items 209 from the inventory locations 206 to be transported as packaged items 290 to the verification stations 280.

According to one embodiment, packaged items 290 may be provided to the verification stations 280 in batches as orchestrated by the batch assignment application 236. For example, a pick manifest or one or more shipping labels generated by the order fulfillment application 233 may orchestrate the picking of items 209 for multiple orders 212 using the fulfillment cart 100. To this end, the routes followed by an operator through the inventory storage area 203 to pick the items 209 from the inventory locations 206 may be generated for a maximum efficiency in the route followed by the operator. For example, a route generated for an operator to pick and package a batch of items 209 may be generated based at least in part on a picking zone 245 assigned to the operator.

The route generated for the operator may be set forth in the pick manifest (also referred to as a summary pick sheet) or may be set forth in pick information printed on shipping labels. For example, the order fulfillment application 233 may be executed to generate and print shipping labels comprising pick information that directs an operator to an inventory location 206 of an item 209 corresponding to the shipping label. To this end, the pick information on the shipping labels may include any identifiable inventory location 206 such as an aisle number, a bin number, a shelf number, a serial identification number, a quantity, an item name, an item description, and/or other information that may be useful in locating an item 209 in the materials handling center 200. Similarly, the pick information set forth on the shipping labels may aid a person in packaging the corresponding one of the items 209 in a suitable mailer 115 or packaging, such as an envelope, a padded envelope or mailer, a box, or other suitable packaging. As an item 209 is located in the materials handling center 200 using a shipping label, the shipping label is removed from its position on the fulfillment cart 100, and affixed to a mailer 115 comprising the item 209, which mailer is then sealed and placed in the bin 114 (FIG. 1A). The operator then proceeds to the next shipping label and a subsequent inventory location 206 indicated thereby.

Although the shipping labels may be used to guide an operator to inventory locations 206 for items 209 in the materials handling center 200, the pick manifest generated by the order fulfillment application 233 may comprise a more concise set of instructions that direct personnel in fulfillment of a batch of orders 212. For example, the pick manifest may instruct the operator to proceed to a first inventory location 206 for a given item 209, affix a top-most shipping label to a mailer 115, place the given item 209 inside the mailer 115, and seal the mailer 115 for shipment as a packaged item 290. The packaged item 290 may be placed in a container 112 for packaged items 290 on the fulfillment cart 100.

After generating the pick manifest and/or the shipping labels, the cart configuration application 239 generates a cart configuration manifest that dictates a proper configuration of the fulfillment cart 100 such that a picking and packaging of items 209 may be performed without performing tasks beyond an initial configuration of the fulfillment cart 100. For example, the cart configuration application 239 may direct personnel responsible for configuring the fulfillment cart 100, e.g., the operator to perform the pick and package process or another operator, to load a predefined number of a first type of mailer 115 in a first container 112, a predefined number of a second type of mailer 115 in a second container 112, and so forth, in order to perform fulfillment of a batch generated by the batch assignment application 236. Further, a plurality of containers 112 may be preloaded with a type of mailer 115 and may be stored in certain areas of the materials handling center 200. The cart configuration manifest may direct an operator to detachably attach a preloaded container 112 to the frame 103 of the fulfillment cart 100 at a certain location. As a result, time used by personnel in retrieving additional mailers 115, stools 139, shipping labels, or other tasks to perform a pick and package process may be reduced or avoided.

After a proper configuration of the fulfillment cart 100 using the cart configuration manifest, the operator may proceed to a first inventory location identified either in the pick manifest or on a top-most of the shipping labels. The operator may proceed accordingly until all items 209 in the batch are packaged. When all items 209 in the batch are packaged, the operator may move the packaged items 290 to the verification stations 280 or, in some embodiments, directly to the shipping areas 283 for shipment.

In some embodiments, prior to shipment, personnel may perform a scan of a tracking identifier located on each shipping label. A client device 221 may direct the scanning of the tracking identifier, as may be appreciated. In response to a scan of the tracking identifier, a status for the order 212 of the item 209 may be updated to a "packaged" or a "shipped" state by the order fulfillment application 233. Further, in some embodiments, a weight of a packaged item 290 may be compared against a weight of the items 209 associated with a corresponding order 212. If the weights are equal, or if they are within a predefined threshold, the packaged item 290 may be confirmed as having the proper items 209 within the mailer 115.

Figure 3:
FIG. 3 is a pictorial diagram of an example shipping label generated in the networked environment of FIG. 2 according to various embodiments of the present disclosure.

Referring next to FIG. 3, shown is a non-limiting example of a shipping label 300 generated by the order fulfillment application 233 (FIG. 2) according to various embodiments. In the non-limiting example of FIG. 3, the shipping label 300 may comprise postage information 303, pick information 306, destination information 309, delivery confirmation information 312, and/or other information as can be appreciated. The postage information 303 may comprise standard information used by a carrier in delivering mail or a package, such as a machine-readable identifier (e.g., a quick response (QR) code or a bar code). The pick information 306 on the shipping label 300 includes any identifiable inventory location 206 (FIG. 2) or any information associated with the item. For example, the pick information 306 may include an aisle number, a bin number, a shelf number, a serial identification number, a quantity, an item name, an item description, a product identification number, and/or other information that may be useful in locating an item 209 (FIG. 2) in the materials handling center 200 (FIG. 2). Similarly, the pick information 306 on the shipping label 300 may aid the operator in placing an item 209 in a suitable mailer 115 (FIG. 1A) or packaging, such as an envelope, a padded envelope or mailer, a box, or other suitable packaging. In various embodiments, the pick information 306 may comprise a machine-readable identifier that assists in picking and packaging an item 209 in a mailer 115.

In various embodiments, the shipping label 300 may comprise a perforation 315 that facilitates a removal of the pick information 306 from a portion (e.g., a top-most portion) of the shipping label 300 prior to placement on a suitable mailer. In various embodiments, the perforation 315 may be located between the pick information 306 and the postage information 303. The perforation 315 may be torn, cut, or otherwise broken by an operator performing a consolidated pick and pack operation to remove the portion of the shipping label 300 comprising the pick information 306.

The destination information 309 may include a return address, a destination address, geo-coordinates, or other suitable information to be used by a courier in delivering a packaged item 290 (FIG. 2). The delivery confirmation information 312 may include a serial number and/or a machine-readable identifier to be used by the courier in verifying delivery of the packaged item 290.

Figure 4:
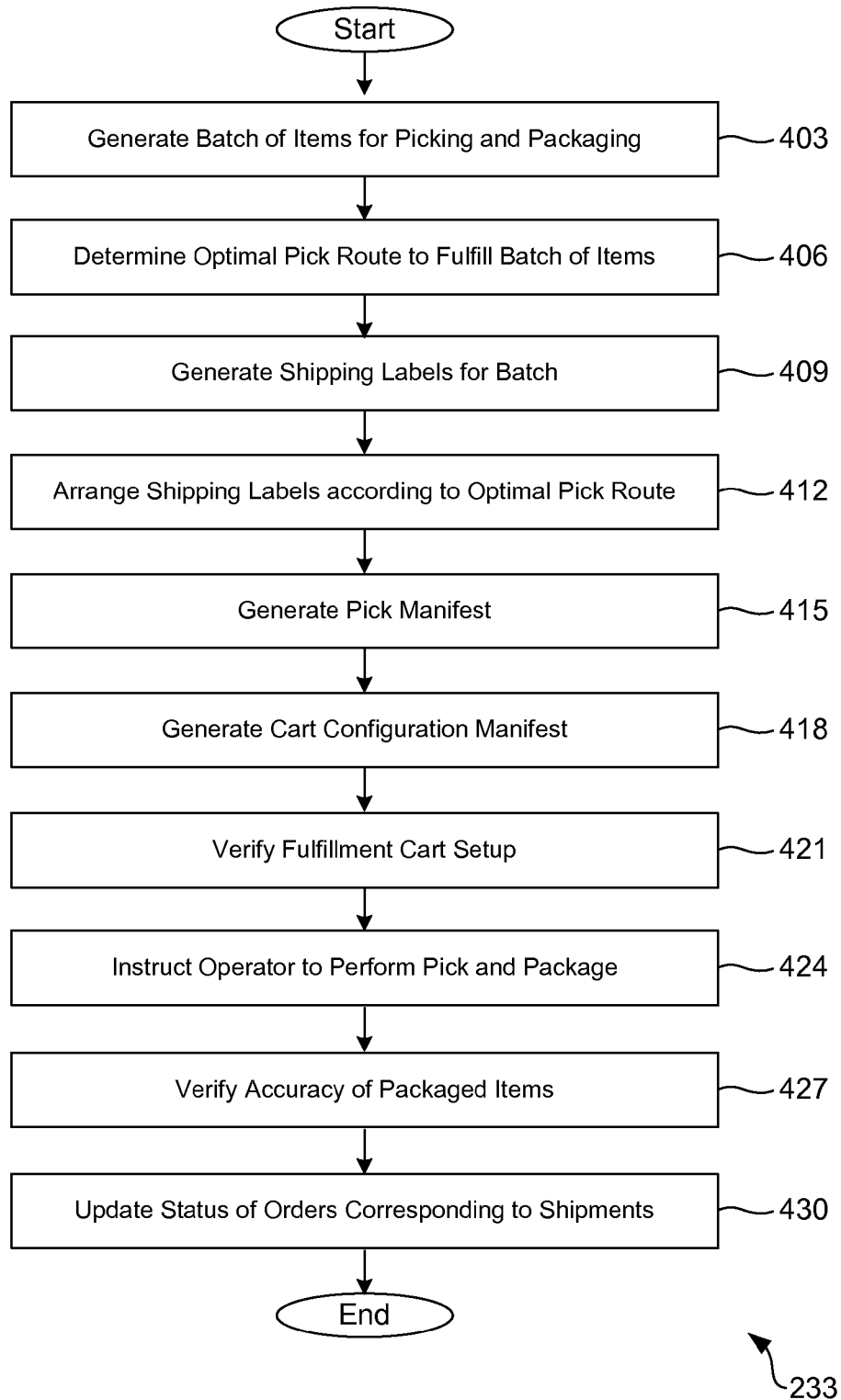
FIG. 4 is a flowchart illustrating one example of functionality implemented as portions of an order fulfillment application executed in a computing environment in the networked environment of FIG. 2 according to various embodiments of the present disclosure.

Turning now to FIG. 4, shown is a flowchart that provides one example of the operation of a portion of the order fulfillment application 233 according to various embodiments. It is understood that the flowchart of FIG. 4 provides merely an example of the many different types of functional arrangements that may be employed to implement the operation of the portion of the order fulfillment application 233 as described herein. As an alternative, the flowchart of FIG. 4 may be viewed as depicting an example of elements of a method implemented in the computing environment 218 (FIG. 2) according to one or more embodiments.

As noted above, the order fulfillment application 233 receives orders 212 (FIG. 2) for the purchase of items 209 (FIG. 2) from an order generation system. Such an order generation system may comprise, for example, an electronic commerce system that facilitates the ordering and purchasing of goods over the internet or other networks as can be appreciated. Beginning with 403, a batch of items 209 to pick and package in fulfillment of orders 212 is generated by the order fulfillment application 233. In various embodiments, a batch may comprise a plurality of items 209 within a certain picking zone 245 (FIG. 2) in a material handling center 200 (FIG. 2).

Next, in 406, an optimal pick route may be determined to fulfill the batch of items 209. A pick route may comprise a route followed by an operator through the inventory storage area 203 to pick the items 209 from the inventory locations 206. As may be appreciated, the pick route may be generated for a maximum efficiency in the route followed by the operator. For example, a route generated for an operator to pick and package a batch of items 209 may be generated based at least in part on a picking zone 245 (FIG. 2) assigned to the operator.

In 409, one or more shipping labels 300 (FIG. 3) may be generated for the batch of items 209 to be fulfilled. For example, the order fulfillment application 233 may be executed to generate shipping labels 300 comprising pick information 306 (FIG. 3) that directs an operator to inventory locations 206 (FIG. 2) of the items 209 in the batch. In various embodiments, each of the items 209 may correspond to a shipping label 300. The pick information 306 on the shipping labels 300 may include any identifiable inventory location 206 such as an aisle number, a bin number, a shelf number, a serial identification number, a quantity, an item name, an item description, and/or other information that may be useful in locating an item in the materials handling center 200. Similarly, the pick information 306 set forth on the shipping labels 300 may aid a person in packaging the corresponding one of the items 209 in a suitable mailer 115 (FIG. 1A) or packaging, such as an envelope, a padded envelope or mailer, a box, or other suitable packaging. As an item 209 is located in the materials handling center 200 using a shipping label 300, the shipping label 300 may be affixed to a mailer 115 comprising the item 209, which mailer is then sealed for transport. The operator then proceeds to the next shipping label 300 and a subsequent inventory location 206 indicated thereby.

As an order of shipping labels 300 may be used to navigate inventory locations 206 in the materials handling center 200, in 412, the shipping labels 300 may be arranged or reordered according to the optimal pick route determined in 406. As a result, when the shipping labels 300 are printed according to the optimal pick route, they may be placed directly in the fulfillment cart 100 (FIG. 1A) without a manual rearrangement. An operator may navigate to a first location identified in a top-most one of the shipping labels 300 to pick and package the item 209 corresponding to the top-most one of the shipping labels 300. As the shipping label 300 is removed from the fulfillment cart 100 and attached to a mailer 115, the next shipping label 300 may direct the operator to a next inventory location 206, and so forth, until all items 209 in a batch have been fulfilled. In various embodiments, the order fulfillment application 233 may cause a print operation of the shipping labels 300 according to the arrangement determined based at least in part on the optimal pick route. In various embodiments, the print operation may be performed on a printer in the materials handling center 200.

Although the shipping labels 300 may be used to guide an operator to inventory locations 206 for items 209 in the materials handling center 200, in 415, a pick manifest may be generated by the order fulfillment application 233. In various embodiments, the pick manifest may comprise a concise set of instructions that direct operators in fulfillment of a batch of orders 212. For example, the pick manifest may instruct the operator to proceed to a first inventory location 206 for a given item 209, affix a top-most shipping label 300 to a mailer 115, place the given item 209 inside the mailer 115, and seal the mailer 115 for shipment as a packaged item 290. The packaged item 290 may be placed in the bin 114 for packaged items 290 on the fulfillment cart 100. As the shipping labels 300 may comprise enough information to fulfill a batch of items 209, in various embodiments, the pick manifest may be optional.

After generating the pick manifest and/or the shipping labels 300, in 418, the cart configuration application 239 (FIG. 2) may generate a cart configuration manifest that dictates a proper configuration of the fulfillment cart 100 such that picking and packaging of items 209 may be performed without performing tasks beyond an initial configuration of the fulfillment cart 100. For example, the cart configuration application 239 may direct personnel responsible for configuring the fulfillment cart 100, e.g., the operator to perform the pick and package process or another operator, to load a predefined number of a first type of mailer 115 in a first container 112, a predefined number of a second type of mailer 115 in a second container 112, and so forth, in order to perform fulfillment of a batch generated by the batch assignment application 236. In various embodiments, the cart configuration application 239 may generate a document or a user interface comprising instructions for configuring the fulfillment cart 100 in a text-based, audio, or video format.

In 421, the order fulfillment application 233 may verify that the fulfillment cart 100 has been configured according to the cart configuration manifest. To this end, personnel in the materials handling center 200 may use the client device 221 (FIG. 2) to provide user input indicating that the fulfillment cart 100 has been configured according to the cart configuration manifest. Next, in 424, the order fulfillment application 233 may instruct an operator or other personnel to perform the picking and packaging of items 209 in the batch. As can be appreciated, the operator may proceed accordingly until all items 209 in the batch are packaged.

When all items 209 in the batch are packaged, the operator may move the packaged items 209 to the verification stations 280 (FIG. 2). In 427, the packaged items 290 are inspected to verify an accuracy of a package item (e.g., whether an order 212 associated with a shipment has been correctly fulfilled or whether the package includes the correct item 209). In various embodiments, a weight of a packaged item 290 may be compared against a weight of the items 209 associated with a corresponding order 212. If the weights are equal, or if they are within a predefined threshold, the packaged item 290 may be confirmed as having the proper items 209 within the mailer 115. Once items 209 are packaged, then the packaged items 290 are forwarded to the shipping areas 283 (FIG. 2) for placement on transport vehicles, such as delivery trucks, for shipment to destination addresses. A client device 221 may direct the scanning of a tracking identifier on the shipping labels 300 of the packaged items 290 while in the shipping areas 283, as may be appreciated. In response to a scan of the tracking identifier, in 430, a status for the order 212 of the item 209 may be updated to a "packaged" or a "shipped" state by the order fulfillment application 233.

Figure 5:
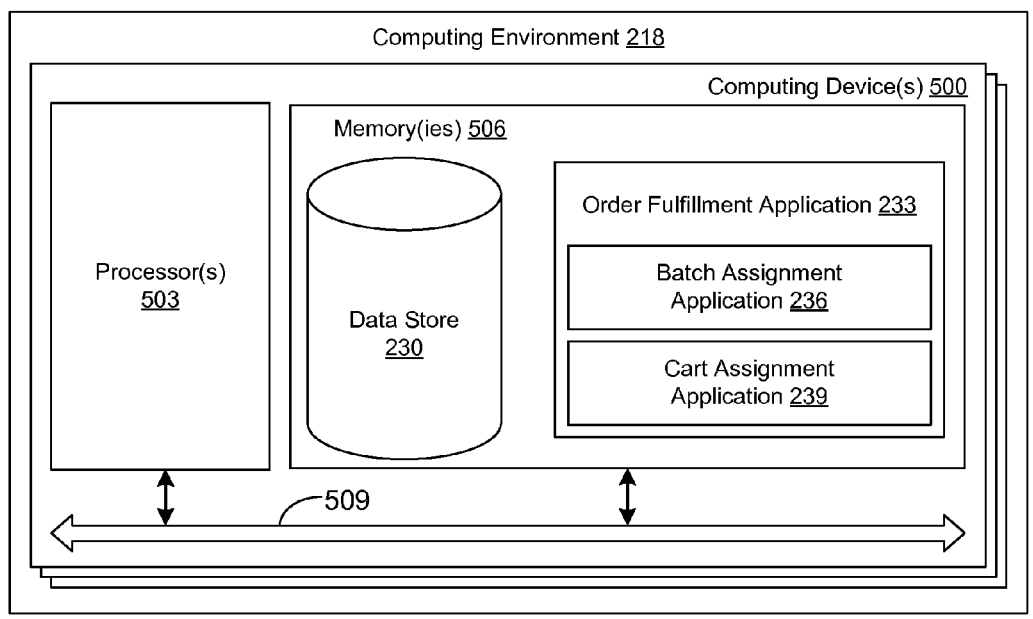
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 218 according to an embodiment of the present disclosure. The computing environment 218 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the order fulfillment application 233, the batch assignment application 236, the cart configuration application 239, and potentially other applications. Also stored in the memory 506 may be a data store 230 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the order fulfillment application 233, the batch assignment application 236, the cart configuration application 239, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the order fulfillment application 233, the batch assignment application 236, and the cart configuration application 239. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the order fulfillment application 233, the batch assignment application 236, and the cart configuration application 239, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the order fulfillment application 233, the batch assignment application 236, and the cart configuration application 239, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 218. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A fulfillment cart, comprising:
   a frame comprising a push handle at a first distal end of the frame,
   a bin positioned on a second distal end of the frame, the bin being detachably attached to the frame and configured to receive at least one packaged item;
   a first compartment;
   a second compartment positioned vertically below the first compartment;

a third compartment positioned vertically below the second compartment;

the first compartment, the second compartment, and the third compartment being defined by the frame and being positioned between and adjacent to the push handle and the bin;

a first one of a plurality of containers positioned in the first compartment and comprising an exposed top portion such that a first type of mailer stored therein is exposed between a processing tray positioned on the push handle and the bin;

a second one of the plurality of containers positioned in the second compartment and comprising an exposed front portion such that a second type of mailer stored therein is horizontally exposed towards the first distal end of the frame;

a hanging arrangement configured to store a third type of mailer, the hanging arrangement comprising a plurality of legs coupled to the frame adjacent to the first compartment;

a plurality of shipping labels having pick information thereon, the pick information comprising at least an inventory location and a suitable packaging for each of a plurality of items to be picked and packaged using the fulfillment cart;

a shipping label holder located at a distal end of the processing tray configured to receive and secure the plurality of shipping labels during a movement of the fulfillment cart and configured to display an outermost one of the plurality of shipping labels at a position angled towards a front of the fulfillment cart; and a plurality of wheels coupled to a base of the frame.

2. The fulfillment cart of claim 1, wherein the first one of the plurality of containers and the second one of the plurality of containers are detachably attached to the frame.

3. The fulfillment cart of claim 1, wherein the plurality of shipping labels stored on the shipping label holder are arranged based at least in part on an optimal pick route determined by at least one computing device.

4. The fulfillment cart of claim 1, wherein the fulfillment cart does not include an electrical device.

5. The fulfillment cart of claim 1, wherein the wheels comprise at least one of: a swivel lock, a pneumatic brake, and an electric brake.

6. The fulfillment cart of claim 1, wherein the pick information is stored on a perforated region of the plurality of shipping labels configured to be removed prior to placement of the plurality of shipping labels on the first type of packaging or the second type of packaging.

7. The fulfillment cart of claim 1, wherein the frame further comprises a platform at the first distal end of the frame below the push handle, the platform defining a bottom of the third compartment.

8. The fulfillment cart of claim 7, further comprising a stool positioned on the platform and at least partially in the third compartment.

9. The fulfillment cart of claim 8, further comprising a vertically protruding bar configured to secure and retain the stool in a fixed position during movement of the fulfillment cart.

10. A cart, comprising:

a frame comprising a push handle, a processing tray, and a shipping label holder positioned on the tray, the shipping label holder being configured to store a plurality of shipping labels and display an outermost one of the plurality of shipping labels towards a front of the cart, the frame comprising a plurality of compartments and at least one bin;

a first opening defined by a top-most one of the plurality of compartments of the frame, the first opening being positioned adjacent to and between the processing tray and the bin;

a second opening defined by a middle one of the plurality of compartments of the frame;

a first one of a plurality of containers configured to store a first type of packaging and having an exposed top portion that provides access to the first type of packaging through the first opening;

a second one of the plurality of containers configured to store a second type of packaging and having an exposed side portion that provides access to the first type of packaging through the second opening;

the plurality of shipping labels, wherein individual ones of the plurality of shipping labels comprise pick information having an inventory location and a packaging identifier;

a hanging arrangement configured to store a third type of packaging thereon, wherein the hanging arrangement is positioned on a side of the frame adjacent to the first opening; and a plurality of wheels coupled to a base of the frame.

11. The cart of claim 10, wherein the at least one bin and the plurality of containers are detachably attached to the frame.

12. The cart of claim 10, wherein the shipping label holder is further configured to secure the plurality of shipping labels to the cart.

13. The cart of claim 10, wherein the shipping label holder is positioned on a distal end of the processing tray.

14. The cart of claim 10, wherein the plurality of shipping labels are arranged based at least in part on an optimal pick route determined by at least one computing device.

15. The cart of claim 10, wherein pick information is stored on a perforated region of each of the plurality of shipping labels configured, the perforated region being configured for removal prior to placement of the plurality of shipping labels on the first type of packaging or the second type of packaging.

16. The cart of claim 10, wherein the first type of packaging is a first type of mailer, the second type of packaging is a second type of mailer, and the third type of packaging is a third type of mailer.

17. An arrangement, comprising:

a frame comprising a push handle at a first distal end of the frame, a processing tray on at least a portion of the push handle, a shipping label holder situated at a distal end of the processing tray, a plurality of compartments situated directly between the processing tray and the at least one bin;

a bin positioned at a second distal end of the frame;

a plurality of containers positioned in the plurality of compartments, wherein at least a first one of the plurality of containers comprises an exposed top portion that forms a first opening in a first one of the plurality of compartments and a second one of the plurality of containers comprises an exposed side portion that forms a second opening in a second one of the plurality of compartments;

a plurality of shipping labels positioned in the shipping label holder such that an outermost of the plurality of shipping labels faces an operator of the frame during operation;

a first type of mailer packaging stored in a first one of the plurality of compartments;

a second type of mailer packaging stored in a second one of the plurality of compartments; and a plurality of wheels coupled to a base of the frame that facilitate a movement of the frame.

18. The arrangement of claim 17, further comprising:

a hanging arrangement positioned on the frame adjacent to the first opening; and a third type of mailer packaging stored on the hanging arrangement.

19. The arrangement of claim 17, wherein the plurality of shipping labels are arranged based at least in part on an optimal pick route determined by at least one computing device.

20. The arrangement of claim 17, wherein the at least one bin has a height greater than a total height of the first one of the plurality of containers and the second one of the plurality of containers.

* * * * *